Nov. 24, 1964 F. G. BACK ETAL 3,158,076
CONTROL DEVICE FOR ZOOM LENS SYSTEMS
Filed Nov. 30, 1962 4 Sheets-Sheet 1

INVENTORS
FRANK G. BACK
WILLI H. SCHRADER
BY Albert F. Kornman
ATTORNEY

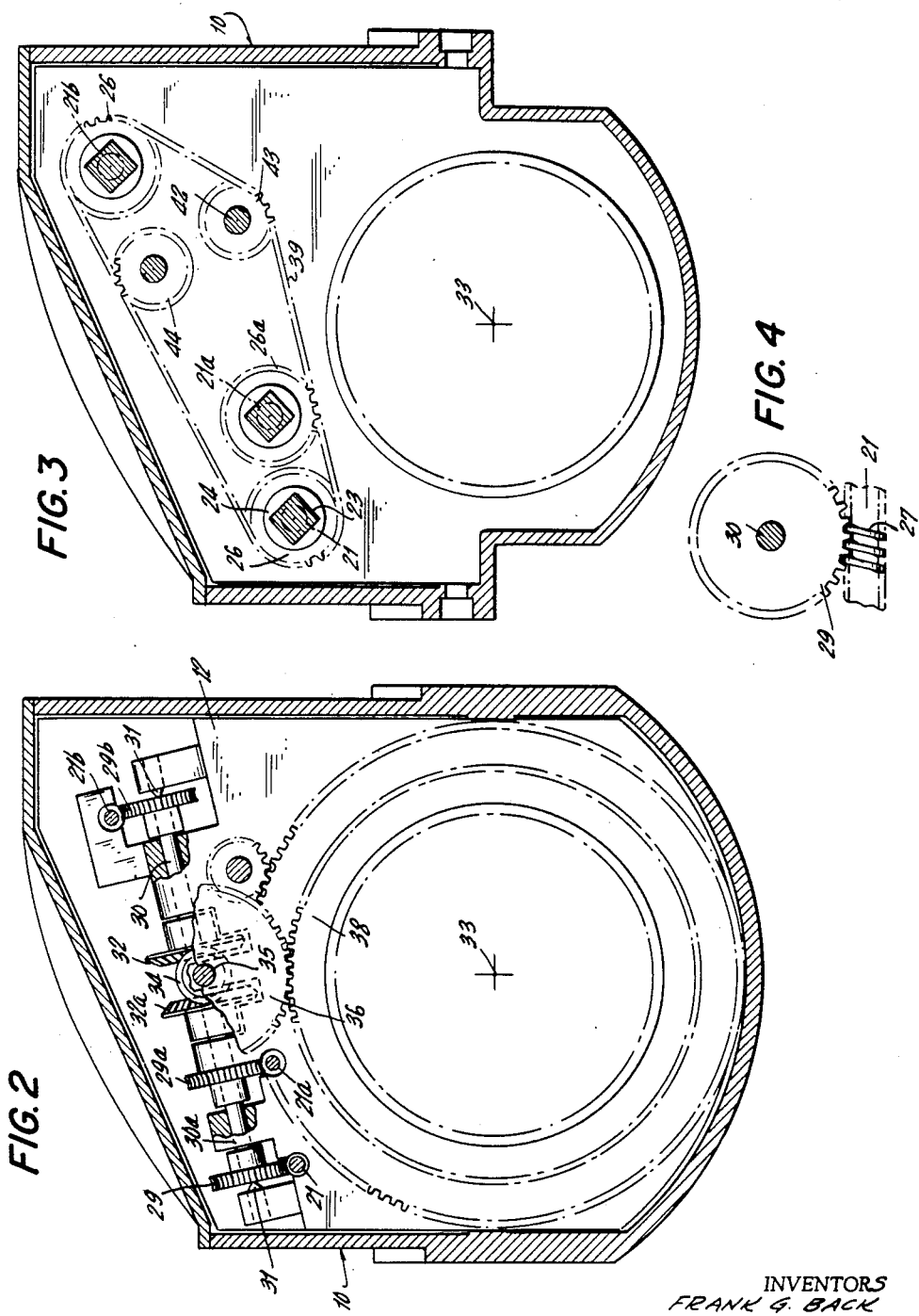

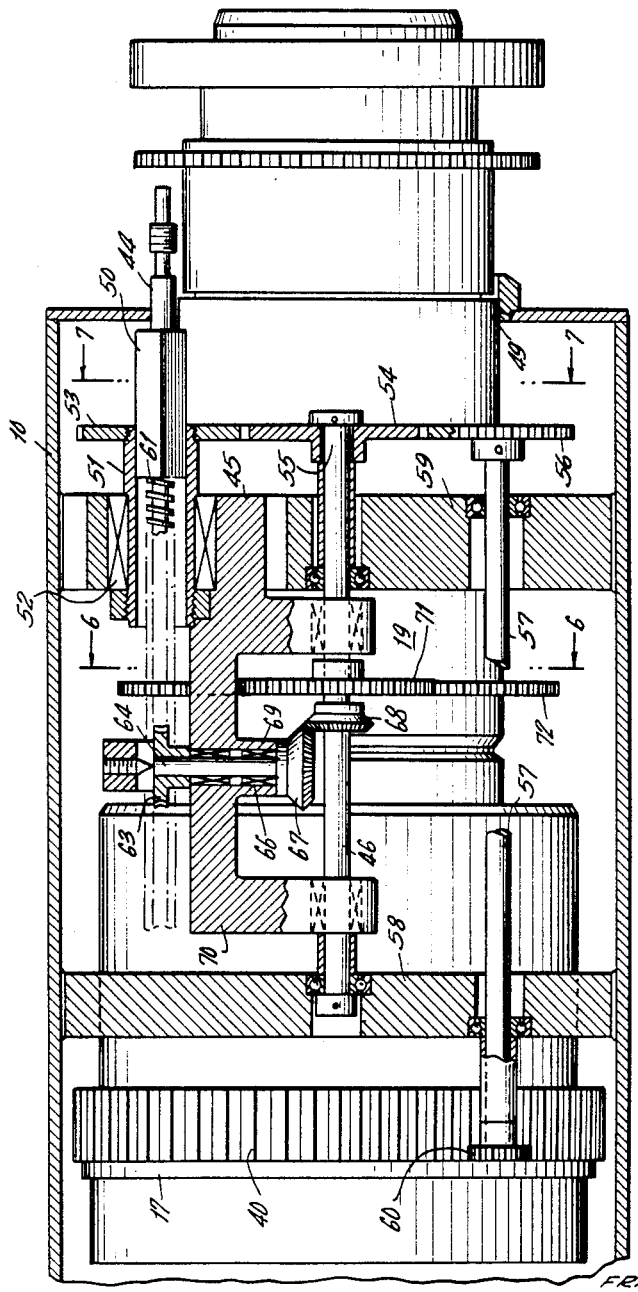

Nov. 24, 1964  F. G. BACK ETAL  3,158,076
CONTROL DEVICE FOR ZOOM LENS SYSTEMS
Filed Nov. 30, 1962  4 Sheets-Sheet 4

INVENTORS
FRANK G. BACK
WILLI H. SCHRADER
BY
Albert F. Kronman
ATTORNEY

United States Patent Office 3,158,076
Patented Nov. 24, 1964

3,158,076
CONTROL DEVICE FOR ZOOM LENS SYSTEMS
Frank G. Back, 55 Seacliff Ave., Glen Cove, N.Y., and Willi H. Schrader, Glen Cove, N.Y.; said Schrader assignor to Frank G. Back, doing business as Research and Development Co., Glen Cove, N.Y.
Filed Nov. 30, 1962, Ser. No. 241,219
13 Claims. (Cl. 95—45)

This invention relates to control mechanisms for mechanically compensated varifocal lenses for television cameras.

In the development of varifocal or zoom lenses it has been found most convenient to operate the zoom and focusing action by means of a single zoom rod in which longitudinal motion is employed for zooming and a rotary motion for focusing. This accepted operation which is adaptable to optically compensated varifocal lenses, where a plurality of lens elements are moved in the same direction at the same time for shifting from the telescopic to the wide angle position, could not heretofore be applied to mechanically compensated varifocal lens systems where the lens elements have to be shifted in different directions and for different distances during the operation of the apparatus.

Accordingly, it is an object of the present invention to provide a control means for a mechanically compensated varifocal lens systems whereby the system may be controlled by means of a single rod.

Another object of the present invention is to provide a lens controlling apparatus for a mechanically compensated varifocal lens systems which will be responsive to a longitudinal motion of the control lever for zooming purposes and a rotary motion of the control lever for focusing purposes.

Another object of the present invention is to provide a control mechanism for a mechanically compensated varifocal lens systems which is adaptable to a wide variety of camera installations.

Another object of the present invention is to provide a control for a varifocal lens systems which is compact and may be built within the lens housing.

Another object of the present invention is to provide a dependable accurate, trouble-free control mechanism for a mechanically compensated verifocal lens systems.

A feature of the present invention is its use of an elongated rod having a helical groove or worm therein for actuating the lens elements of the mechanically compensated varifocal lens systems.

Another feature of the present invention is its use of elongated gears for transmitting the motion of the control rod to the various lenses for focusing purposes.

Another feature of the present invention is its use of a plurality of control stations whereby the varifocal lens assembly can be used with cameras having different physical specifications.

Another feature of the present invention is its use of a swingable segment for adapting the control apparatus to any one of a plurality of cameras.

The invention consists of the construction, combination and arrangement of parts, as herein illustrated, described and claimed.

In the accompanying drawings, forming a part hereof are illustrated two forms of embodiment of the invention, in which drawings similar reference characters designate corresponding parts, and in which:

FIGURE 2 is a cross-sectional view taken on line 2—2 in FIGURE 1, looking in the direction of the arrows.

FIGURE 3 is a cross-sectional view taken on line 3—3 of FIGURE 1, looking in the direction of the arrows.

FIGURE 4 is a fragmentary detailed view showing the manner in which the helically grooved rod actuates the gear members for zoom purposes.

FIGURE 5 is a view in longitudinal section with certain elements shown in elevation of a second embodiment of the present invention.

Figure 1:
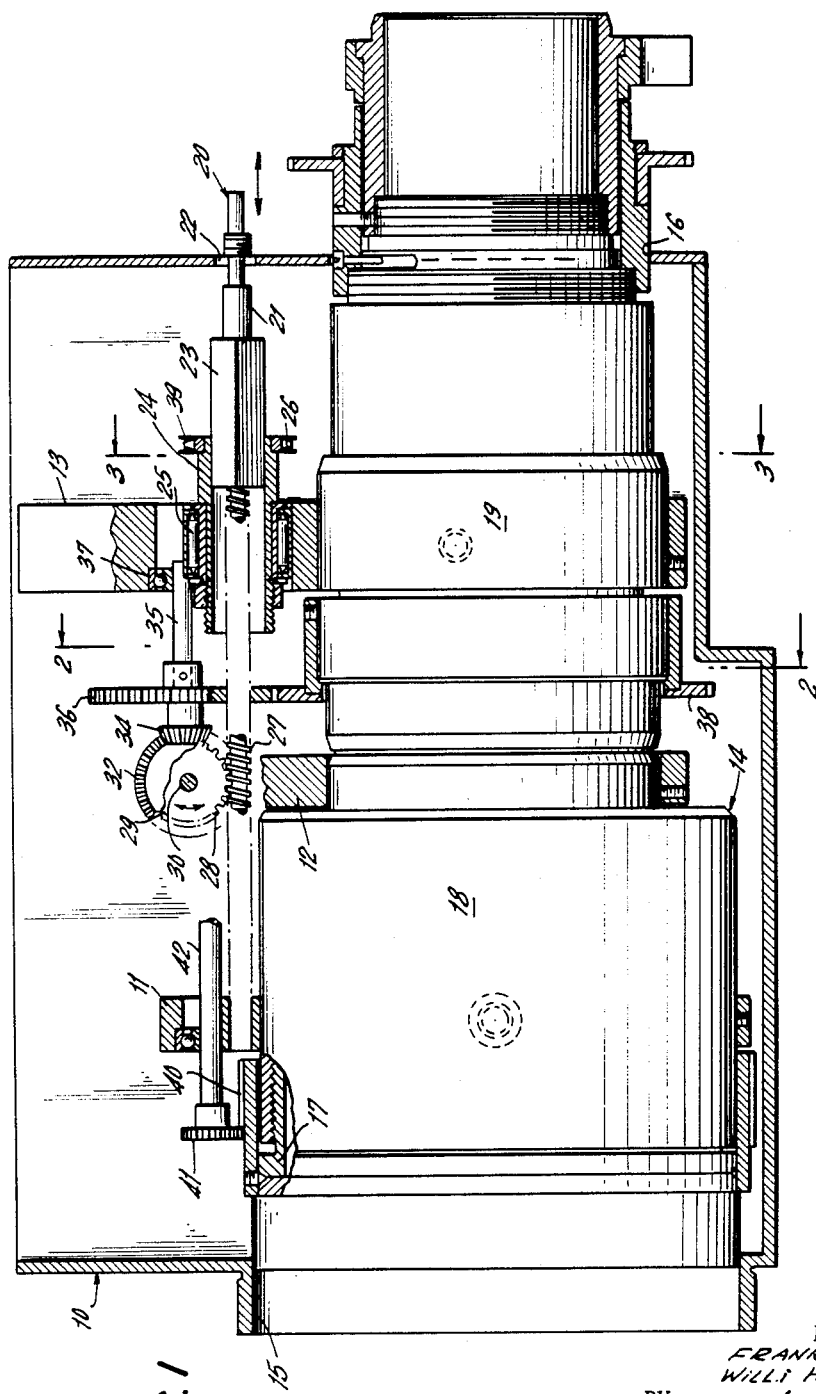
FIGURE 1 is a view in longitudinal section with certain parts shown in elevation of a complete embodiment of the varifocal lens control device made in accordance with the present invention.

Referring to the drawings and particularly to FIGURE 1, 2 and 3, 10 indicates the housing for a varifocal lens system. A series of spaced wall members 11, 12, 13 are carried within the housing 10 and secured thereto. The wall members 11, 12, 13, support a mechanically compensated varifocal lens system 14 within the housing 10. An opening 15 is provided in the front of the housing 10 to admit light into the lens system 14, which lens system projects through a second opening 16 in the housing 10 for engagement with a camera (not shown).

The varifocal lens assembly 14 illustrated by way of example, is provided with a rotatable barrel 17 at the front thereof which is threadably received within a stationary barrel 18 for focusing purposes. A second rotatable barrel 19 is journaled within the fixed barrel portion of the mechanically compensated varifocal lens assembly and operated through a series of cams, followers and other mechanical apparatus well known in the mechanically compensated varifocal lens art to bring about the desired movement of the variator and compensator lens elements to achieve the full zoom range. It has been found that the only practical method of achieving this movement with accuracy is to provide a rotationally disposed mechanical member such as the barrel 19 for this purpose.

It will be apparent to those skilled in the art that the operator of the varifocal lens will require a mechanism whereby he can zoom to the desired point in the range of the lens system and thereafter focus the system if necessary. These two operations are achieved simply and satisfactorily by the mechanism shown above the varifocal lens 14 in FIGURE 1 and coupled thereto in the manner hereinafter more fully set forth. The control mechanism generally indicated at 20 is operated by means of any one of three elongated rods 21, 21a, 21b, each of which extend rearwardly of the housing 10 through openings 22 therein. The end of the rod 21 in use is provided with an actuating handle (not shown) threadably received on the end thereof. Each of the rods 21, 21a, 21b, is provided with an elongated collar or key 23, having a square cross-sectional shape as shown in FIGURE 3. The collar 23 is slidably received within a bushing 24 journaled within the fixed wall 13 by means of needle bearings 25. The bushing 24 is internally broached to conform to the shape of the collar 23 so that rotation of any one of the rods 21, 21a, 21b, and collar 23 causes the bushing 24 to turn within the bearings 25.

A small sprocket gear 26 is secured to the inner ends of the bushing 24 as shown in FIGURE 1, for a hereinafter more fully disclosed purpose.

Each rod 21, 21a, 21b, beyond the collar 23 is provided with a worm or helically grooved portion 27 which is machined to conform in shape to the teeth 28 of three spaced worm gears 29, 29a, 29b, shown in FIGURES 1 and 2. The worm gears 29, 29a, 29b, are secured to one of two spaced shaft members 30, 30a, which are journaled upon a common axis within the second wall member 12 and supported on their outer ends by pins 31. A small beveled gear 32, 32a, is secured to the inner end of each of the shafts 30, 30a, respectively. As any one of the rods 21, 21a, 21b, is slid axially through the bushing 24 the helically grooved portion 27 will tangentially drive the worm gears 29, 29a, 29b, with which it is in mesh thereby causing the beveled gears 32, 32a, to rotate. The purpose of the three rods is to permit the control mechanism to be actuated at any one of three stations and thereby make it adaptable to a wide variety of cameras in which the distance from the actuating rod to the optical center of the system indicated at 33 in FIGURES 2 and 3, may vary. Longitudinal motion of the rod 21, for example, will drive the worm gear 29 which in turn will rotate the shaft 30a, carrying with it the beveled gear 32a. The beveled gear 32a is in mesh with a small pinion gear 34 secured to the end of a shaft 35. The shaft 35 has attached thereto a spur gear 36 which is turned with the said shaft 35. The shaft 35 is journaled within the second wall 13 by ball bearings 37.

Motion imparted to the pinion gear 34 by the beveled gear 32a is transmitted through the shaft 35 to the spur gear 36 which in turn drives the second rotatable barrel 19 of the varifocal lens system through a ring gear 38 secured to the said barrel. When longitudinal motion is imparted to one of the rods 21 or 21a, the beveled gear 32 which is also in mesh with pinion 32, but secured to shaft 30 will rotate and turn shaft 30 but will not otherwise affect the operation of the control mechanism. When longitudinal motion is imparted to the rod 21b, the beveled gear 32 will be caused to drive the pinion 34 and the opposite beveled gear 32a will rotate without affecting the operation of the control mechanism. Rotation of the barrel 19 will permit the varifocal lens system to be operated throughout its zoom range in the manner well known in the mechanically compensated varifocal lens art.

When it is desired to focus the varifocal lens system illustrated herein it is merely necessary to rotate one of the rods 21, 21a, 21b, which has been selected for the particular camera application. As the rod 21, for example, is rotated, the collar 23 turns the bushing 24 with which it is in engagement. The sprocket gear 26 secured to the end of the bushing 24 is also caused to rotate with the said bushing. A sprocket chain 39 is carried upon the sprocket gear 26 and is also in engagement with a similar sprocket gear 26a, 26b, carried upon a corresponding bushing (not shown) on each of the shafts 21a, 21b. It will be apparent that rotary motion imparted to any one of the shafts will drive the sprocket gears on all of the shafts through the medium of the chain 39. In this manner, the lens system may be actuated for focusing from any one of three positions each having a different distance from the optical center of the lens assembly as clearly indicated in FIGURES 2 and 3. Rotation of the rods 21, 21a, 21b, does not significantly change the zoom setting.

Referring to FIGURES 1 and 3, it will be seen that the front rotatable barrel 17 which is employed for focusing purposes is provided with an elongated external ring gear at 40 and that the teeth of the gear are in mesh with a small gear 41. The gear 41 is secured to the end of a focusing shaft 42 which is journaled within the fixed wall member 11. The opposite or inner end of the shaft 42 has attached thereto a sprocket wheel 43 (see FIG. 3). The sprocket wheel 43 is driven by the chain 39 which is actuated by the rotation of one of the rods 21, 21a, 21b. In this manner the rotational movement imparted to the rods is translated into rotation of the front rotatable barrel 17 for focusing purposes. The sprocket gear 44 shown in FIGURE 3 is merely for chain tensioning purposes.

The elongated gear 40 on the barrel 17 enables the gear 41 to remain in mesh with the gear teeth despite the longitudinal movement of the barrel 17.

Figure 6:
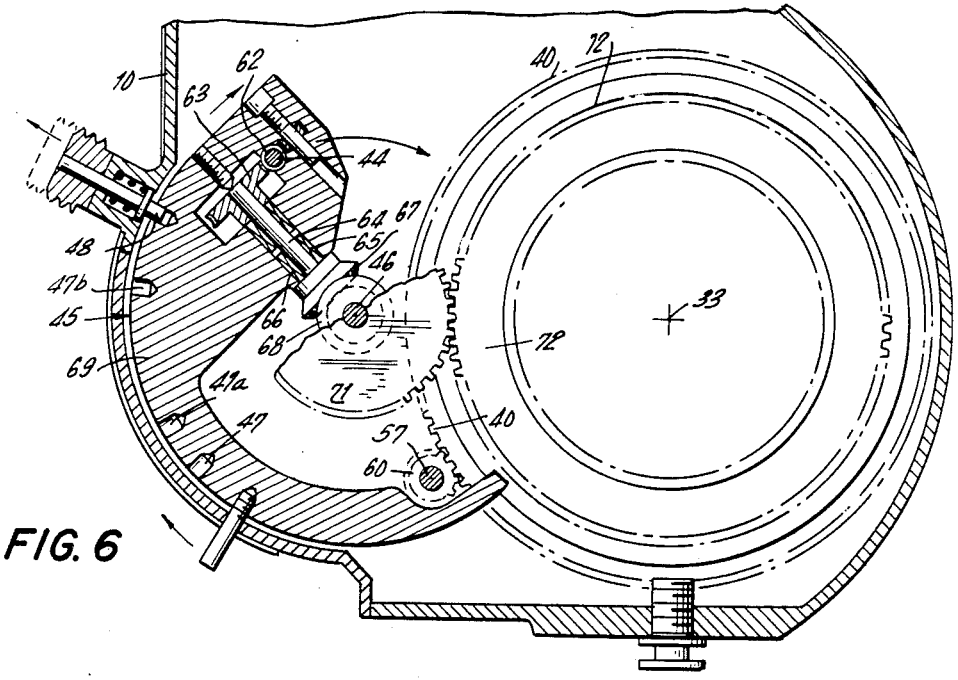
FIGURE 6 is a cross-sectional view taken on line 6—6 in FIGURE 5, looking in the direction of the arrows.
Figure 7:
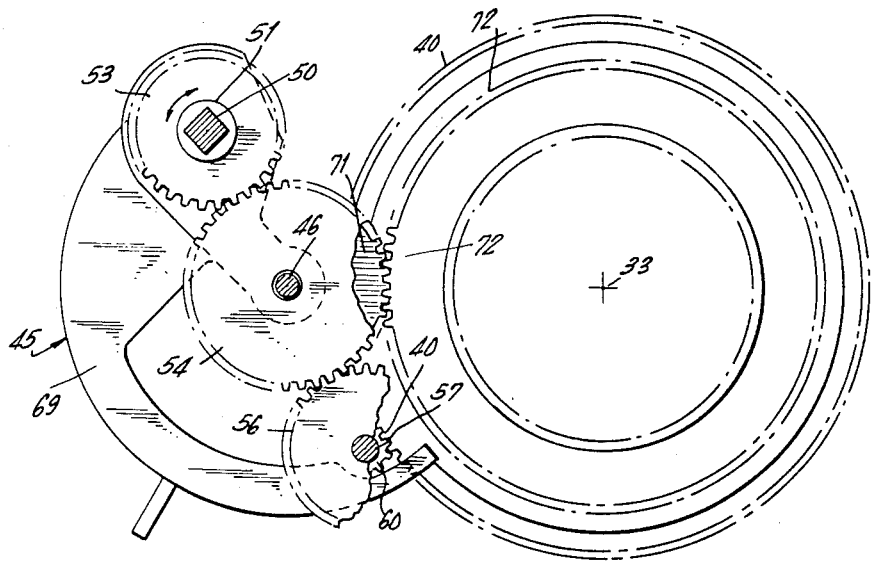
FIGURE 7 is a cross-sectional view taken on line 7—7 in FIGURE 5, looking in the direction of the arrows.

Referring now to FIGURES 5, 6, 7, there is shown another embodiment of the present invention in which a single control rod 44 carried by a swingable segment 45 serves to operate the varifocal lens system from any one of a large number of different positions with respect to the optical center of the lens system. The segment 45 which has two normally disposed portions 69, 70, each somewhat C-shaped in configuration is swingably mounted upon a shaft 46, the outwardly extending portion 69 is provided with a plurality of peripheral bores 47, 47a, 47b, etc., whereby the segment may be held so that the distance from the control rod 44 to the optical center 33 of the lens system meets the camera requirements. A spring loaded pin 48 is carried by the housing 10 as shown in FIGURE 6 for securing the segment 45 in any of the desired positions by engaging one of the recesses 47, 47a, 47b, etc. The housing 10 in this embodiment is also provided with an opening 49 at the rear thereof to permit the rod 44 to project therethrough at any one of the selected positions.

The rod 44 is provided with a squared collar 50 which is slidably received within a bushing 51 in the manner hereinabove described in connection with FIGURES 1–4. The bushing 51 is journaled within the segment 45 upon needle bearings 52. A spur gear 53 is secured to the inner end of the bushing 51 and rotates therewith. The spur gear 53 is in mesh with an idler spur gear 54 freely carried upon the inner end 55 of shaft 46 which supports the segment 45. The idler spur gear 54 is part of a train of gears which terminates in the spur gear 56 secured to the inner end of the focusing shaft 57. The focusing shaft 57 is rotatably held within the spaced walls 58, 59. A small spur gear 60 is secured to the front end of the focusing shaft 57 and is in mesh with the elongated gear portion 40 of the front rotatable barrel 17 of the varifocal lens system. It will be seen that rotation of the control rod 44 will be transmitted through the collar 50, bushing 51, gear train 53, 54, 56, shaft 57, focusing spur gear 60 and gear 40 to rotate the barrel 17 for focusing purposes.

As shown in FIGURE 5, the control rod 44 is provided with a helically grooved or worm portion 61 which can be longitudinally slid within the housing 10 by pushing or pulling the control rod 44 through the bushing 51. The worm 62 formed by the helical grooves 61 are in mesh with a worm gear 63 secured to the upper end of a small arbor 64. The arbor 64 is journaled within a bore 65 in the upper portion of the C-shaped portion 69 of the segment 45 and laterally supported by bearings 66. The lower portion of the arbor 64 has a pinion gear 67 secured thereto. The pinion gear 67 is in mesh with a beveled gear 68 secured to the elongated shaft 46. The shaft 46 is journaled at each end within fixed walls 58, 59. The shaft 46 also serves as a bearing surface for the somewhat C-shaped portion 70 of the segment 45. The shaft 46 has secured thereto a spur gear 71 which turns with the shaft 46 and is in mesh with a ring gear 72 attached to the second rotatable barrel 19 of the varifocal lens system.

It will be seen that as the rod 44 is slid axially of the lens system through the bushing 51, rotary motion will be imparted to the worm gear 63, pinion gear 67, beveled gear 68, spur gear 71, and ring gear 72 to rotate the barrel 19 and bring about the zooming action of the lens system. As shown in FIGURE 6, the spur gear 71 will remain in mesh with the ring gear 72 for all positions of the segment 45, which may be required to adapt the control mechanism to various cameras. When the shaft 46 is rotated by the action of the gears 67, 68, the end portion 55 of the shaft 46 which supports the idler spur gear 54 will turn freely within the said gear 54 without affecting the focusing of the lens system.

From the foregoing it will be seen that there has been provided control mechanisms for mechanically compensated varifocal lens systems which will respond to the conventional operational motions for optically compensated varifocal lenses, namely, longitudinal pushing or pulling for zoom purposes and rotation for focusing. The control mechanisms are simple in structure, compact, readily adaptable to a large variety of cameras and dependable. In addition, the control mechanism can be incorporated within a housing and built around the lens system without greatly increasing the bulk of the said varifocal lens system. The varifocal lens system illustrated herein is merely by way of illustration, it being understood that the present invention can be applied to a wide variety of mechanically compensated varifocal lens structure provided said structures are controlled by a rotational movement of one or more barrels. It will also be apparent that the control rods 23, 44, may be provided with a series of annular grooves or other gear driving structures in lieu of the worm 27, 61, without departing from the present invention.

Having thus fully described the invention what is claimed as new and desired to be secured by Letters Patent of the United States, is:

1. A control device for a mechanically compensated zoom lens system having a rotatable barrel for focusing and a rotatable barrel for driving the movable zoom lens elements comprising a housing, a longitudinally slidable and rotatable control rod in said housing, a collar portion on said control rod having a non-circular cross-sectional shape, a fixed bushing journaled within the housing to slidably receive the collar portion of the rod and having a non-circular opening therein to prevent rotation of the collar within the bushing, a worm section on the control rod, a first gear means driven by the worm section portion on the control rod, a ring gear secured to the rotatable zoom barrel and operatively coupled to the first gear means to rotate the said rotatable zoom barrel, a second gear means carried by the fixed bushing and responsive to the rotary motion of the control rod, intermediate driven means coupled to the second gear means, an elongated gear on the rotatable focusing barrel and means including the driven means to rotate the elongated gear of the rotatable focusing barrel to focus the varifocal lens system.

2. A control device for a mechanically compensated zoom lens system having a rotatable barrel for focusing and a rotatable barrel for driving the movable zoom lens elements comprising a housing, a plurality of longitudinally slidable and rotatable control rods in said housing, a collar portion on each of said control rods having a non-circular cross-sectional shape, a plurality of fixed bushings journaled within the housing to slidably receive the collar portion of the rods and having a non-circular opening therein to prevent rotation of the collar within the bushing, a worm section on each of the control rods, a first gear means coupled to each of the worm sections whereby longitudinal motion of any one of the control rods will drive the first gear means, a ring gear secured to the rotatable zoom barrel and operatively coupled to the first gear means to rotate the said rotatable zoom barrel, a second gear means carried by each of the bushings, means to operatively couple the second gear means whereby rotary motion imparted to one of the gear means will drive the other second gear means, intermediate driven means coupled to the second gear means, an elongated gear on the rotatable focusing barrel, and means including the driven means to rotate the elongated gear of the rotatable focusing barrel to focus the zoom lens system.

3. A control device for a mechanically compensated zoom lens system having a rotatable barrel for focusing and a rotatable barrel for driving the movable zoom lens elements comprising a housing, a plurality of longitudinally slidable and rotatable control rods in said housing, a collar portion on each of said control rods having a non-circular cross-sectional shape, a plurality of fixed bushings journaled within the housing to slidably receive the collar portion of the rods and having a non-circular opening therein to prevent rotation of the collar within the bushing, a worm section on each of the control rods, a first gear means coupled to each of the worm sections comprising spaced worm gears, a shaft for each of the worm gears, a bevel gear on each of said shafts, a pinion gear in mesh with the bevel gears, a shaft for the pinion gear and a spur gear secured to the pinion gear shaft whereby longitudinal motion of any one of the control rods will drive the first gear means, a ring gear secured to the rotatable zoom barrel and operatively coupled to the first gear means spur gear to rotate the said rotatable zoom barrel, a second gear means carried by each of the bushings, means to operatively couple the second gear means whereby rotary motion imparted to one of the gear means will drive the other second gear means, intermediate driven means coupled to the second gear means, an elongated gear on the rotatable focusing barrel, and means including the driven means to rotate the elongated gear of the rotatable focusing barrel to focus the zoom lens system.

4. A device according to claim 2 in which each of the control rods is disposed a different distance from the optical center of the zoom lens system.

5. A control device for a mechanically compensated zoom lens system having a rotatable barrel for focusing and a rotatable barrel for driving the movable zoom lens elements comprising a housing, a plurality of longitudinally slidable and rotatable control rods in said housing, a collar portion on each of said control rods having a non-circular cross-sectional shape, a plurality of fixed bushings journaled within the housing to slidably receive the collar portion of the rods and having a non-circular opening therein to prevent rotation of the collar within the bushing, a worm section on each of the control rods, a first gear means coupled to each of the worm sections whereby longitudinal motion of any one of the control rods will drive the first gear means, a ring gear secured to the rotatable zoom barrel and operatively coupled to the first gear means to rotate the said rotatable zoom barrel, a second gear means comprising a sprocket gear carried by each of the bushings, means comprising a sprocket chain to operatively couple the second gear means whereby rotary motion imparted to one of the gear means will drive the other second gear means, intermediate driven means coupled to the second gear means, an elongated gear on the rotatable focusing barrel, and means including the driven means to rotate the elongated gear of the rotatable focusing barrel to focus the zoom lens system.

6. A control device for a mechanically compensated zoom lens system having a rotatable barrel for focusing and a rotatable barrel for driving the movable zoom lens elements comprising a housing, a plurality of longitudinally slidable and rotatable control rods in said housing, a collar portion on each of said control rods having a non-circular cross-sectional shape, a plurality of fixed bushings journaled within the housing to slidably receive the collar portion of the rods and having a non-circular opening therein to prevent rotation of the collar within the bushing, a worm section on each of the control rods a first gear means coupled to each of the worm sections whereby longitudinal motion of any one of the control rods will drive the first gear means, a ring gear secured to the rotatable zoom barrel and operatively coupled to the first gear means to rotate the said rotatable zoom barrel, a second gear means comprising a sprocket gear carried by each of the bushings, means comprising a sprocket chain to operatively couple the second gear means whereby rotary motion imparted to one of the gear means will drive the other second gear means, intermediate driven means comprising an elongated focusing shaft, a spur gear at one end of the focusing shaft secured thereto and coupled to the second gear means, an elongated gear on the rotatable focusing barrel, and means including a spur gear on the focusing shaft of the driven means to rotate the elongated gear of the rotatable focusing barrel to focus the zoom lens system.

7. A control device for a mechanically compensated zoom lens system having a rotatable barrel for focusing and a rotatable barrel for driving the movable lens elements comprising a housing, a plurality of longitudinally slidable and rotatable control rods in said housing each disposed a different distance from the optical center of the zoom lens system, a collar portion on each of said control rods having a non-circular cross-sectional shape, a plurality of fixed bushings journaled within the housing to slidably receive the collar portion of the rods and having a non-circular opening therein to prevent rotation of the collar within the bushing, a worm section on each of the control rods, a first gear means coupled to each of the worm sections comprising spaced worm gears, a shaft for each of the worm gears, a bevel gear on each of said shafts, a pinion gear in mesh with the bevel gears, a shaft for the pinion gear and a spur gear secured to the pinion gear shaft whereby longitudinal motion of any one of the control rods will drive the first gear means, a ring gear secured to the rotatable zoom barrel and operatively coupled to the first gear means spur gear to rotate the said rotatable zoom barrel, a second gear means comprising a sprocket gear carried by each of the bushings, means comprising a sprocket chain to operatively couple the second gear means whereby rotary motion imparted to one of the gear means will drive the other second gear means, intermediate driven means comprising an elongated focusing shaft, a spur gear at one end of the focusing shaft secured thereto and coupled to the second gear means, an elongated gear on the rotatable focusing barrel, and means including a spur gear on the focusing shaft of the driven means to rotate the elongated gear of the rotatable focusing barrel to focus the zoom lens system.

8. A control device for a mechanically compensated zoom lens system having a rotatable barrel for focusing and a rotatable barrel for driving the movable zoom lens elements comprising a housing, a longitudinally disposed shaft in said housing, a segment swingably carried by the shaft, a bushing journaled within the segment, a non-circular opening in said bushing, a longitudinally slidable and rotatable control rod in said bushing, a non-circular collar portion on said rod slidably received by and conforming to the opening in the bushing, a worm section on the control rod, a first gear means carried by the segment and driven by the longitudinal travel of the worm section, a ring gear secured to the rotatable zoom barrel and operatively coupled to the first gear means to rotate the said rotatable zoom barrel, a second gear means carried by the bushing and responsive to the rotary motion of the control rod, intermediate driven means coupled to the second gear means, an elongated gear on the rotatable focusing barrel, means including the driven means to rotate the elongated gear of the rotatable focusing barrel to focus the zoom lens system and means to secure the segment in one of a plurality of preselected positions within the housing to vary the distance of the control rod from the optical axis of the zoom lens system.

9. A control device for a mechanically compensated zoom lens system having a rotatable barrel for focusing and a rotatable barrel for driving the movable zoom lens elements comprising a housing, a longitudinally disposed shaft in said housing, a segment swingably carried by the shaft, a bushing journaled within the segment, a non-circular opening in said bushing, a longitudinally slidable and rotatable control rod in said bushing, a non-circular collar portion on said rod slidably received by and conforming to the opening in the bushing, a worm section on the control rod, a first gear means comprising an arbor, a worm gear secured to the arbor carried by the segment and driven by the longitudinal travel of the worm section, a pinion gear on the arbor opposite the worm gear, a bevel gear in mesh with the pinion gear and secured to the longitudinally disposed shaft, a spur gear secured to the said shaft, a ring gear secured to the rotatable zoom barrel and operatively coupled to the first gear means by the spur gear to rotate the said rotatable zoom barrel, a second gear means carried by the bushing and responsive to the rotary motion of the control rod, intermediate driven means coupled to the second gear means, an elongated gear on the rotatable focusing barrel, means including the driven means to rotate the elongated gear of the rotatable focusing barrel to focus the zoom lens system and means to secure the segment in one of a plurality of preselected positions within the housing to vary the distance of the control rod from the optical axis of the zoom lens system.

10. A control device for a mechanically compensated zoom lens system having a rotatable barrel for focusing and a rotatable barrel for driving the movable zoom lens elements comprising a housing, a longitudinally disposed shaft in said housing, a segment swingably carried by the shaft, a bushing journaled within the segment, a non-circular opening in said bushing, a longitudinally slidable and rotatable control rod in said bushing, a non-circular collar portion on said rod slidably received by and conforming to the opening in the bushing, a worm section on the control rod, a first gear means carried by the segment and driven by the longitudinal travel of the worm section, a ring gear secured to the rotatable zoom barrel and operatively coupled to the first gear means to rotate the said rotatable zoom barrel, a second gear means comprising a spur gear carried by the bushing and responsive to the rotary motion of the control rod, intermediate driven means comprising a gear train coupled to the bushing spur gear of the second gear means, an elongated gear on the rotatable focusing barrel, means including the driven means to rotate the elongated gear of the rotatable focusing barrel to focus the zoom lens system and means to secure the segment in one of a plurality of preselected positions within the housing to vary the distance of the control rod from the optical axis of the zoom lens system.

11. A control device for a mechanically compensated zoom lens system having a rotatable barrel for focusing and a rotatable barrel for driving the movable zoom lens elements comprising a housing, a longitudinally disposed shaft in said housing, a segment swingably carried by the shaft, a bushing journaled within the segment, a non-circular opening in said bushing, a longitudinally slidable and rotatable control rod in said bushing, a non-circular collar portion on said rod slidably received by and conforming to the opening in the bushing, a worm section on the control rod, a first gear means carried by the segment and driven by the longitudinal travel of the worm section, a ring gear secured to the rotatable zoom barrel and operatively coupled to the first gear means to rotate the said rotatable zoom barrel, a second gear means carried by the bushing and responsive to the rotary motion of the control rod, intermediate driven means coupled to the second gear means, an elongated gear on the rotatable focusing barrel, means comprising an elongated focusing shaft journaled within the housing, a spur gear one one end of the shaft in mesh with the elongated gear and a driven spur gear on the opposite end of the shaft in mesh with the driven means to rotate the elongated gear of the rotatable focusing barrel to focus the zoom lens system and means to secure the segment in one of a plurality of preselected positions within the housing to vary the distance of the control rod from the optical axis of the zoom lens system.

12. A device according to claim 8 in which the segment varying and securing means comprises a substantially C shaped outwardly extending portion on the segment, a plurality of spaced recesses in the outwardly extending portion and means to selectively engage one of said recesses to hold the segment at a desired location.

13. A control device for a mechanically compensated zoom lens system having a rotatable barrel for focusing and a rotatable barrel for driving the movable lens elements comprising a housing, a longitudinally disposed shaft in said housing, a segment swingably carried by the shaft, a bushing journaled within the segment, a non-circular opening in said bushing, a longitudinally slidable and rotatable control rod in said bushing, a non-circular collar portion on said rod slidably received by and conforming to the opening in the bushing, a worm section on the control rod, a first gear means comprising an arbor, a worm gear secured to the arbor carried by the segment and driven by the longitudinal travel of the worm section, a pinion gear on the arbor opposite the worm gear, a bevel gear in mesh with the pinion gear and secured to the longitudinally disposed shaft, a spur gear secured to the said shaft, a ring gear secured to the rotatable zoom barrel and operatively coupled to the first gear means by the spur gear to rotate the said rotatable zoom barrel, a second gear means comprising a spur gear carried by the bushing and responsive to the rotary motion of the control rod, intermediate driven means comprising a gear train coupled to the bushing spur gear of the second gear means, an elongated gear on the rotatable focusing barrel, means comprising an elongated focusing shaft journaled within the housing, a spur gear on one end of the shaft in mesh with the elongated gear and a driven spur gear on the opposite end of the shaft in mesh with the driven means to rotate the elongated gear of the rotatable focusing barrel to focus the zoom lens system and means to secure the segment in one of a plurality of preselected positions within the housing to vary the distance of the control rod from the optical axis of the zoom lens system.

References Cited by the Examiner
UNITED STATES PATENTS
2,984,154   5/61   Walker _____ 95—45 X NORTON ANSHER, *Primary Examiner.*
JOHN M. HORAN, *Examiner.*